(12) United States Patent
Noda

(10) Patent No.: US 11,803,030 B2
(45) Date of Patent: *Oct. 31, 2023

(54) IMAGING LENS AND IMAGING APPARATUS

(71) Applicant: FUJIFILM Corporation, Tokyo (JP)

(72) Inventor: Taiga Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,340

(22) Filed: Feb. 8, 2022

(65) Prior Publication Data

US 2022/0269041 A1 Aug. 25, 2022

(30) Foreign Application Priority Data

Feb. 22, 2021 (JP) ................................ 2021-026602

(51) Int. Cl.
*G02B 9/08* (2006.01)
*G02B 9/06* (2006.01)

(52) U.S. Cl.
CPC ...... *G02B 9/08* (2013.01); *G02B 9/06* (2013.01)

(58) Field of Classification Search
CPC .................................. G02B 9/06; G02B 9/08
USPC ...................................................... 359/794
See application file for complete search history.

(56) References Cited

U.S. PATENT DOCUMENTS

| 2011/0170195 | A1 | 7/2011 | Muratani et al. |
| 2012/0026590 | A1 | 2/2012 | Muratani et al. |
| 2018/0275380 | A1* | 9/2018 | Sudoh ................. G02B 15/142 |
| 2019/0113721 | A1* | 4/2019 | Katayose ........... G02B 27/0062 |
| 2019/0265441 | A1* | 8/2019 | Katayose ........... G02B 13/0045 |
| 2020/0166730 | A1 | 5/2020 | Nagami et al. |
| 2020/0333569 | A1 | 10/2020 | Kondo |

FOREIGN PATENT DOCUMENTS

| JP | 2012-088619 A | | 5/2012 |
| JP | 2013137377 A | * | 7/2013 |
| JP | 2020-086173 A | | 6/2020 |
| JP | 2020-177110 A | | 10/2020 |

* cited by examiner

*Primary Examiner* — George G. King
(74) *Attorney, Agent, or Firm* — Studebaker & Brackett PC

(57) ABSTRACT

The imaging lens consists of, in order from the object side, a front group that includes a stop and has a positive refractive power, and a rear group. During focusing, the entire front group integrally moves, and the rear group remains stationary with respect to an image plane. The rear group includes one or more air lenses formed by two concave lens surfaces facing toward each other. The imaging lens satisfies Conditional Expressions: 0.1<Bf/f<0.9 and −0.7<(Rrf+Rrr)/(Rrf−Rrr)<−0.025, where a back focal length of a whole system is Bf, a focal length of the whole system is f, and a curvature radius of an object side surface of the air lens in the rear group is Rrf and a curvature radius of an image side surface of the air lens in the rear group is Rrr.

19 Claims, 8 Drawing Sheets

EXAMPLE 1

EXAMPLE 1

EXAMPLE 2

EXAMPLE 3

IMAGING LENS AND IMAGING APPARATUS

CROSS-REFERENCE TO RELATED APPLICATION

The present application claims priority under 35 U.S.C. § 119 to Japanese Patent Application No. 2021-026602, filed on Feb. 22, 2021. The above application is hereby expressly incorporated by reference, in its entirety, into the present application.

BACKGROUND

Technical Field

A technique of the present disclosure relates to an imaging lens and an imaging apparatus.

Related Art

In the related art, as imaging lenses used in an imaging apparatus such as a digital camera and a video camera, the lens systems described in JP2012-088619A, JP2020-177110A, and JP2020-086173A are known.

In recent years, there has been a demand for an imaging lens which is configured to have a small size and has good optical performance.

SUMMARY

The present disclosure has been made in view of the above circumstances, and an object of the present disclosure is to provide an imaging lens which is configured to have a small size and has good optical performance, and an imaging apparatus comprising the imaging lens.

According to an aspect of the present disclosure, there is provided an imaging lens consisting of, in order from an object side to an image side, a front group that includes a stop and has a positive refractive power, and a rear group. During focusing, an entirety of the front group integrally moves, and the rear group remains stationary with respect to an image plane, the rear group includes one or more air lenses formed by two concave lens surfaces facing toward each other. Assuming that a back focal length of a whole system at an air conversion distance in a state in which an infinite distance object is in focus is Bf, a focal length of the whole system in a state in which the infinite distance object is in focus is f, and a curvature radius of an object side surface of at least one of the air lenses in the rear group is Rrf and a curvature radius of an image side surface thereof is Rrr, Conditional Expressions (1) and (2) are satisfied.

$$0.1 < Bf/f < 0.9 \tag{1}$$

$$-0.7 < (Rrf + Rrr)/(Rrf - Rrr) < -0.025 \tag{2}$$

It is preferable that the imaging lens of the above-mentioned aspect satisfies at least one of Conditional Expression (1-1) or (2-1).

$$0.2 < Bf/f < 0.8 \tag{1-1}$$

$$-0.6 < (Rrf + Rrr)/(Rrf - Rrr) < -0.05 \tag{2-1}$$

It is preferable that the front group includes one or more air lenses formed by two concave lens surfaces facing toward each other. Assuming that a curvature radius of an object side surface of at least one of the air lenses in the front group is Rff and a curvature radius of an image side surface thereof is Rfr, it is preferable that the imaging lens of the above-mentioned aspect satisfies Conditional Expression (3), and it is more preferable that the imaging lens satisfies Conditional Expression (3-1).

$$-0.6 < (Rff + Rfr)/(Rff - Rfr) < 0 \tag{3}$$

$$-0.5 < (Rff + Rfr)/(Rff - Rfr) < -0.05 \tag{3-1}$$

Assuming that a focal length of the whole system is f and a focal length of the rear group is fr in a state in which an infinite distance object is in focus, it is preferable that the imaging lens of the above-mentioned aspect satisfies Conditional Expression (4), and it is more preferable that the imaging lens satisfies Conditional Expression (4-1).

$$0 < f/fr < 0.4 \tag{4}$$

$$0 < f/fr < 0.3 \tag{4-1}$$

It is preferable that the front group consists of, in order from the object side to the image side, a first subgroup, a stop, and a second subgroup. In addition, assuming that a focal length of the first subgroup is f1, and a focal length of the second subgroup is f2, it is preferable that the imaging lens of the above-mentioned aspect satisfies Conditional Expression (5), and it is more preferable that the imaging lens satisfies Conditional Expression (5-1).

$$3.5 < f1/f2 < 16 \tag{5}$$

$$4.5 < f1/f2 < 15 \tag{5-1}$$

Assuming that a sum of Bf and a distance on an optical axis from a lens surface closest to the object side in the front group to a lens surface closest to the image side in the rear group in a state in which the infinite distance object is in focus is TTL, an open F number in a state in which the infinite distance object is in focus is FNo, and a maximum image height is Ymax, it is preferable that the imaging lens of the above-mentioned aspect satisfies Conditional Expression (6), and it is more preferable that the imaging lens satisfies Conditional Expression (6-1).

$$5 < TTL \times FNo/Y\max < 8.5 \qquad (6)$$

$$5.25 < TTL \times FNo/Y\max < 8 \qquad (6-1)$$

Assuming that a sum of Bf and a distance on an optical axis from the stop to a lens surface closest to the image side in the rear group in a state in which the infinite distance object is in focus is StI, and a sum of Bf and a distance on an optical axis from a lens surface closest to the object side in the front group to the lens surface closest to the image side in the rear group in a state in which the infinite distance object is in focus is TTL, it is preferable that the imaging lens of the above-mentioned aspect satisfies Conditional Expression (7).

$$0.3 < StI/TTL < 0.85 \qquad (7)$$

Assuming that a sum of Bf and a distance on an optical axis from the stop to a lens surface closest to the image side in the rear group in a state in which the infinite distance object is in focus is StI, and a sum of Bf and a distance on an optical axis from a lens surface closest to the image side in the front group to the lens surface closest to the image side in the rear group in a state in which the infinite distance object is in focus is DrI, it is preferable that the imaging lens of the above-mentioned aspect satisfies Conditional Expression (8).

$$1.4 < StI/DrI < 2.8 \qquad (8)$$

Assuming that a minimum value of refractive indexes of all lenses in the front group closer to the object side than the stop at a d line is Nd1min, it is preferable that the imaging lens of the above-mentioned aspect satisfies Conditional Expression (9).

$$1.7 < Nd1\min < 2.1$$

It is preferable that the rear group includes one or more positive lenses and one or more negative lenses.

It is preferable that a lens closest to the object side in the front group has a convex surface facing toward the object side, and a lens closest to the image side in the front group has a convex surface facing toward the image side.

It is preferable that the front group includes one or more positive lenses and one or more negative lenses.

It is preferable that the front group includes two or more cemented lenses each including one or more positive lenses and one or more negative lenses.

It is preferable that the front group includes two or more lenses each having a concave surface facing toward the image side at a position closer to the object side than the stop.

According to another aspect of the present disclosure, there is provided an imaging apparatus comprising the imaging lens of the above-mentioned aspect.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "~group having a positive refractive power" means that the group has a positive refractive power as a whole. Similarly, the term "~group having a negative refractive power" means that the group has a negative refractive power as a whole. The terms "a lens having a positive refractive power" and "a positive lens" are synonymous. The terms "a lens having a negative refractive power" and "a negative lens" are synonymous. The terms "front group", "rear group", "first subgroup", and "second subgroup" are not limited to a configuration consisting of a plurality of lenses, but may be a configuration consisting of only one lens.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power, the curvature radius, and the surface shape of the lens including the aspherical surface will be used in terms of the paraxial region unless otherwise specified. Regarding the sign of the curvature radius, the sign of the curvature radius of the convex surface facing toward the object side is positive and the sign of the curvature radius of the convex surface facing toward the image side is negative.

In the present specification, the term "whole system" means an imaging lens. The "back focal length at the air conversion distance" is the air conversion distance on the optical axis from the lens surface closest to the image side in the whole system to the image plane. The "focal length" used in a conditional expression is a paraxial focal length. The values used in conditional expressions are values in a case where the d line is used as a reference in a state in which the infinite distance object is in focus.

The "d line", "C line", "F line", and "g line" described in the present specification are emission lines. In the present specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide an imaging lens which is configured to have a small size and has good optical performance, and an imaging apparatus comprising the imaging lens.

DESCRIPTION OF EMBODIMENTS

Hereinafter, embodiments of the present disclosure will be described with reference to the accompanying drawings.

Figure 1:
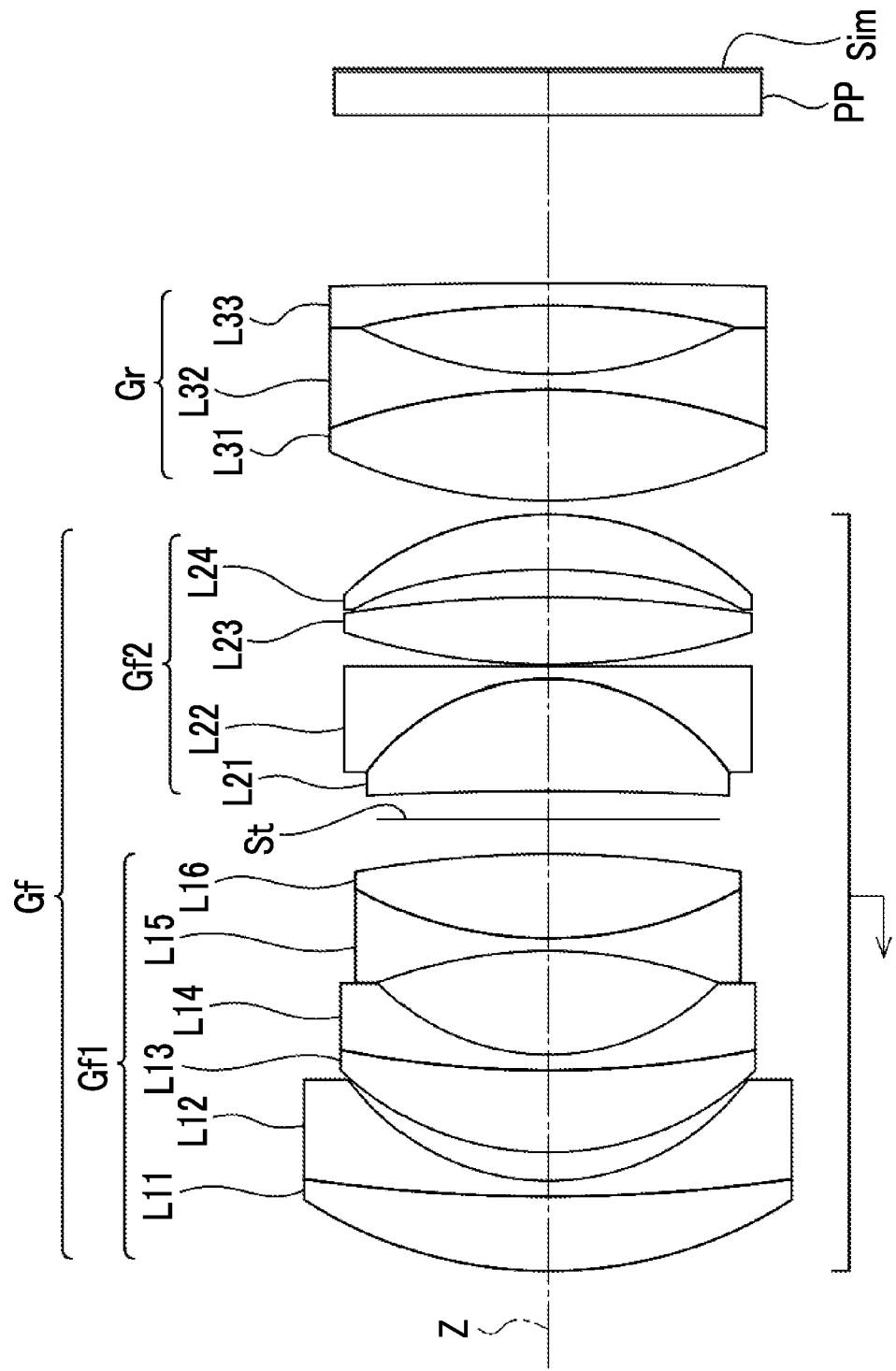
FIG. 1 is a cross-sectional view showing a configuration of an imaging lens according to an embodiment, which corresponds to the imaging lens of Example 1.
Figure 2:
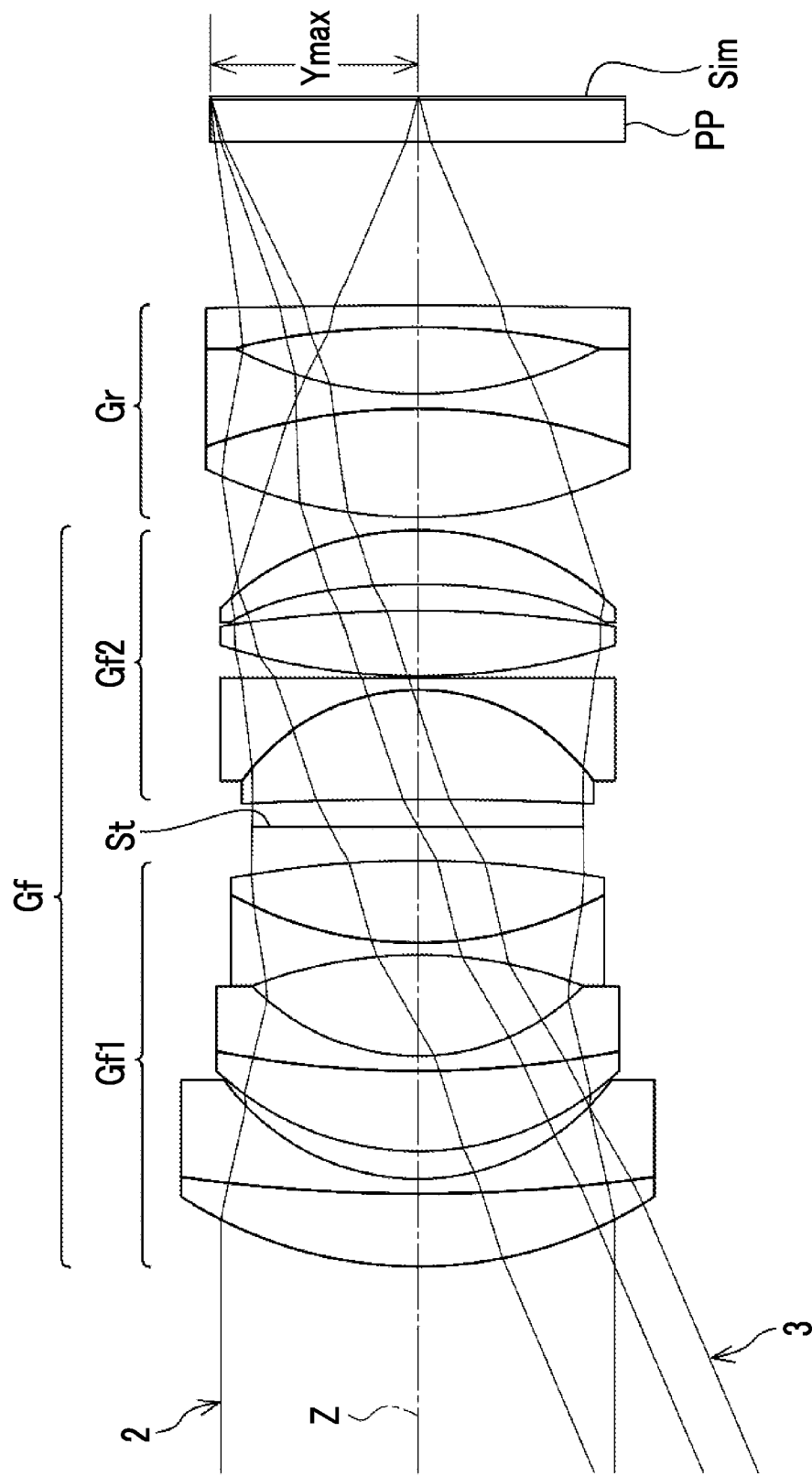
FIG. 2 is a cross-sectional view showing a configuration and luminous flux of the imaging lens of FIG. 1.

FIG. 1 shows a cross-sectional view of the configuration of the imaging lens according to the embodiment of the present disclosure in a state in which an infinite distance object is in focus. In the present specification, an object, of which an object distance (distance on the optical axis from the object to the lens surface closest to the object side) is at infinity, is referred to as the infinite distance object. FIG. 2 shows a cross-sectional view of a configuration and luminous flux of the imaging lens of FIG. 1 in a state in which the infinite distance object is in focus. FIG. 2 shows, as the luminous flux, the on-axis luminous flux 2 and the luminous flux 3 with the maximum image height Ymax. The examples shown in FIGS. 1 and 2 correspond to the imaging lens of Example 1 described later. In FIGS. 1 and 2, the left side is the object side and the right side is the image side. Hereinafter, the imaging lens according to the embodiment of the present disclosure will be described mainly with reference to FIG. 1.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens of FIG. 1 consists of, in order from the object side to the image side along the optical axis Z, a front group Gf, which has a positive refractive power including an aperture stop St, and a rear group Gr. By making the front group Gf have a positive refractive power, it is easy to suppress the total length of the optical system.

For example, the imaging lens of FIG. 1 is configured as follows. The front group Gf consists of a first subgroup Gf1, an aperture stop St, and a second subgroup Gf2 in order from the object side to the image side. The first subgroup Gf1 consists of six lenses L11 to L16 in order from the object side to the image side. The second subgroup Gf2 consists of four lenses L21 to L24 in order from the object side to the image side. The rear group Gr consists of three lenses L31 to L33 in order from the object side to the image side. The aperture stop St of FIG. 1 does not indicate a size and a shape, but indicates a position in the optical axis direction. The method of showing the aperture stop St is the same as that in FIG. 2.

In the imaging lens of the present embodiment, during focusing, the entire front group Gf integrally moves along the optical axis Z as a focus group, and the rear group Gr remains stationary with respect to the image plane Sim. In the present specification, the group that moves during focusing is referred to as a "focus group". Focusing is performed by moving the focus group. The term "integrally move" means to move the same amount in the same direction at the same time. By integrally moving the entire front group Gf including the aperture stop St, it is easy to suppress fluctuations in various aberrations due to focusing. The left-pointing arrow below the front group Gf in FIG. 1 indicates that the front group Gf is a focus group that moves toward the object side during focusing from the infinite distance object to an extremely short range object.

Hereinafter, preferable configurations and possible configurations of the imaging lens of the present embodiment will be described. It should be noted that, in the following description of preferable configurations and possible configurations, the "imaging lens of the present embodiment" is also simply referred to as an "imaging lens" in order to avoid redundancy.

It is preferable that a lens closest to the object side in the front group Gf has a convex surface facing toward the object side, and a lens closest to the image side in the front group Gf has a convex surface facing toward the image side. In such a case, it is easy to suppress fluctuations in various aberrations due to focusing.

It is preferable that the front group Gf includes one or more positive lenses and one or more negative lenses. In such a case, there is an advantage in suppressing fluctuation in chromatic aberration due to focusing.

It is preferable that the front group Gf includes two or more cemented lenses each including one or more positive lenses and one or more negative lenses. In such a case, it is easy to suppress fluctuation in chromatic aberration due to focusing.

It is preferable that the front group Gf includes two or more lenses each having a concave surface facing toward the image side at a position closer to the object side than the aperture stop St. In such a case, there is an advantage in suitably correcting spherical aberration and field curvature.

It is preferable that the rear group Gr includes one or more positive lenses and one or more negative lenses. In such a case, there is an advantage in suitably correcting longitudinal chromatic aberration.

Assuming that a back focal length of the whole system at the air conversion distance is Bf and a focal length of the whole system is f, it is preferable that the imaging lens satisfies Conditional Expression (1). Bf and f are values in a state in which the infinite distance object is in focus. By not allowing the corresponding value of Conditional Expression (1) to be equal to or less than the lower limit, it is possible to suppress an increase in diameter of the lens located on the image side of the aperture stop St, and it is easy to ensure the angle of view. By not allowing the corresponding value of Conditional Expression (1) to be equal to or greater than the upper limit, it is possible to suppress an increase in total length of the optical system. In order to obtain more favorable characteristics, it is more preferable that the imaging lens satisfies Conditional Expression (1-1), and it is yet more preferable that the imaging lens satisfies Conditional Expression (1-2).

$$0.1 < Bf/f < 0.9 \tag{1}$$

$$0.2 < Bf/f < 0.8 \tag{1-1}$$

$$0.25 < Bf/f < 0.7 \tag{1-2}$$

It is preferable that the rear group Gr includes one or more biconvex air lenses formed by two concave lens surfaces facing toward each other. In the present specification, the air spacing interposed between two lens surfaces facing toward each other is regarded as a lens having a refractive index of 1, and the air spacing is referred to as an air lens. Since the biconvex air lenses are present in the rear group Gr, it is easy to suppress the Petzval sum of the whole optical system. In the example of FIG. 1, a biconvex air lens is formed by an image side surface of the lens L32 and an object side surface of the lens L33.

Assuming that a curvature radius of an object side surface of at least one of the air lenses in the rear group Gr is Rrf and a curvature radius of an image side surface thereof is Rrr, it is preferable that the imaging lens satisfies Conditional Expression (2). By not allowing the corresponding value of Conditional Expression (2) to be equal to or less than the lower limit, the emission angle of the off-axis luminous flux emitted to the air side is prevented from becoming excessively large. As a result, there is an advantage in correcting astigmatism. By not allowing the corresponding value of Conditional Expression (2) to be equal to or greater than the upper limit, the incidence angle of the principal ray of the off-axis luminous flux incident on the image plane Sim is prevented from becoming excessively large. Therefore, it is easy to suppress the reduction in amount of peripheral light. In order to obtain more favorable characteristics, it is more preferable that the imaging lens satisfies Conditional Expression (2-1), and it is yet more preferable that the imaging lens satisfies Conditional Expression (2-2).

$$-0.7 < (Rrf + Rrr)/(Rrf - Rrr) < -0.025 \quad (2)$$

$$-0.6 < (Rrf + Rrr)/(Rrf - Rrr) < -0.05 \quad (2\text{-}1)$$

$$-0.5 < (Rrf + Rrr)/(Rrf - Rrr) < -0.1 \quad (2\text{-}2)$$

It is preferable that the front group Gf includes one or more biconvex air lenses formed by two concave lens surfaces facing toward each other. Spherical aberration and astigmatism can be easily corrected by the action of the two lens surfaces of the front group Gf having the concave surfaces facing toward each other. In addition, it is easy to suppress the Petzval sum of the whole optical system. In the example of FIG. 1, a biconvex air lens is formed by an image side surface of the lens L14 and an object side surface of the lens L15.

Assuming that a curvature radius of an object side surface of at least one of the air lenses in the front group Gf is Rff and a curvature radius of an image side surface thereof is Rfr, it is preferable that the imaging lens satisfies Conditional Expression (3). By satisfying Conditional Expression (3), the refractive power of one surface forming the air lens is prevented from being excessively strong or excessively weak with respect to the refractive power of the other surface. As a result, it is easy to suitably correct spherical aberration and astigmatism. In order to obtain more favorable characteristics, it is more preferable that the imaging lens satisfies Conditional Expression (3-1), and it is yet more preferable that the imaging lens satisfies Conditional Expression (3-2).

$$-0.6 < (Rff + Rfr)/(Rff - Rfr) < 0 \quad (3)$$

$$-0.5 < (Rff + Rfr)/(Rff - Rfr) < -0.05 \quad (3\text{-}1)$$

$$-0.4 < (Rff + Rfr)/(Rff - Rfr) < -0.1 \quad (3\text{-}2)$$

Assuming that a focal length of the whole system in a state in which the infinite distance object is in focus is f and a focal length of the rear group Gr is fr, it is preferable that the imaging lens satisfies Conditional Expression (4). By not allowing the corresponding value of Conditional Expression (4) to be equal to or less than the lower limit, the positive refractive power of the front group Gf is prevented from becoming excessively strong. As a result, there is an advantage in suppressing spherical aberration. By not allowing the corresponding value of Conditional Expression (4) to be equal to or greater than the upper limit, the Petzval sum is prevented from becoming excessively large. As a result, there is an advantage in suppressing field curvature. In order to obtain more favorable characteristics, it is more preferable that the imaging lens satisfies Conditional Expression (4-1), and it is yet more preferable that the imaging lens satisfies Conditional Expression (4-2).

$$0 < f/fr < 0.4 \quad (4)$$

$$0 < f/fr < 0.3 \quad (4\text{-}1)$$

$$0 < f/fr < 0.2 \quad (4\text{-}2)$$

In a configuration in which the front group Gf consists of a first subgroup Gf1, an aperture stop St, and a second subgroup Gf2 in order from the object side to the image side, assuming that a focal length of the first subgroup Gf1 is f1, and a focal length of the second subgroup Gf2 is f2, it is preferable that the imaging lens satisfies Conditional Expression (5). By not allowing the corresponding value of Conditional Expression (5) to be equal to or less than the lower limit, the refractive power of the second subgroup Gf2 with respect to the first subgroup Gf1 is prevented from becoming excessively weak. Therefore, it is easy to suppress field curvature. By not allowing the corresponding value of Conditional Expression (5) to be equal to or greater than the upper limit, the refractive power of the second subgroup Gf2 with respect to the first subgroup Gf1 is prevented from becoming excessively strong. As a result, there is an advantage in suppressing astigmatism which occurs in the second subgroup Gf2. In order to obtain more favorable characteristics, it is more preferable that the imaging lens satisfies Conditional Expression (5-1), and it is yet more preferable that the imaging lens satisfies Conditional Expression (5-2).

$$3.5 < f1/f2 < 16 \quad (5)$$

$$4.5 < f1/f2 < 15 \quad (5\text{-}1)$$

$$5 < f1/f2 < 14 \quad (5\text{-}2)$$

Assuming that a sum of Bf and a distance on an optical axis from a lens surface closest to the object side in the front group Gf to a lens surface closest to the image side in the rear group Gr is TTL, an open F number is FNo, and a maximum image height is Ymax, it is preferable that the imaging lens satisfies Conditional Expression (6). Bf is a back focal length of the whole system in the air conversion distance. Bf, TTL, and FNo are values in a state in which the infinite distance object is in focus. By not allowing the corresponding value of Conditional Expression (6) to be equal to or less than the lower limit, excessive reduction in size can be prevented. As a result, there is an advantage in correcting various aberrations. By not allowing the corresponding value of Conditional Expression (6) to be equal to or greater than the upper limit, it is possible to suppress an increase in size of the whole optical system. In order to obtain more favorable characteristics, it is more preferable that the imaging lens satisfies Conditional Expression (6-1), and it is yet more preferable that the imaging lens satisfies Conditional Expression (6-2).

$$5 < TTL \times FNo/Y\max < 8.5 \quad (6)$$

$$5.25 < TTL \times FNo/Y\max < 8 \quad (6\text{-}1)$$

$$5.5 < TTL \times FNo/Y\max < 7 \quad (6\text{-}2)$$

Assuming that a sum of Bf and a distance on an optical axis from the aperture stop St to a lens surface closest to the image side in the rear group Gr is StI, and a sum of Bf and a distance on an optical axis from a lens surface closest to the object side in the front group Gf to the lens surface closest to the image side in the rear group Gr is TTL, it is preferable that the imaging lens satisfies Conditional Expression (7). Bf is a back focal length of the whole system in the air conversion distance. Bf, StI, and TTL are values in a state in which the infinite distance object is in focus. By not allowing the corresponding value of Conditional Expression (7) to be equal to or less than the lower limit, the position of the aperture stop St is prevented from coming excessively close to the image plane Sim. Therefore, it is possible to prevent an incidence angle of the principal ray of the off-axis luminous flux, which is incident on the imaging element disposed on the image plane Sim, from becoming excessively large. By not allowing the corresponding value of Conditional Expression (7) to be equal to or greater than the upper limit, a sufficient space closer to the object side than the aperture stop St can be ensured. Therefore, an appropriate number of lenses can be disposed. As a result, it is possible to configure the lens without forcibly reducing the absolute value of the curvature radius of the lens. Therefore, various aberrations can be suitably corrected. In order to obtain more favorable characteristics, it is more preferable that the imaging lens satisfies Conditional Expression (7-1), and it is yet more preferable that the imaging lens satisfies Conditional Expression (7-2).

$$0.3 < StI/TTL < 0.85 \quad (7)$$

$$0.4 < StI/TTL < 0.8 \quad (7\text{-}1)$$

$$0.5 < StI/TTL < 0.75 \quad (7\text{-}2)$$

Assuming that a sum of Bf and a distance on an optical axis from the aperture stop St to the lens surface closest to the image side in the rear group Gr is StI, and a sum of Bf and a distance on an optical axis from a lens surface closest to the image side in the front group Gf to the lens surface closest to the image side in the rear group Gr is DrI, it is preferable that the imaging lens satisfies Conditional Expression (8). Bf is a back focal length of the whole system in the air conversion distance. Bf, StI, and DrI are values in a state in which the infinite distance object is in focus. By not allowing the corresponding value of Conditional Expression (8) to be equal to or less than the lower limit, a configuration can be made such that the position of the aperture stop St in the front group Gf is prevented from being excessively close to the image side. Therefore, it is possible to suppress an increase in incidence angle of the principal ray of the off-axis luminous flux incident on the image plane Sim. As a result, there is an advantage in suppressing reduction in amount of peripheral light. By not allowing the corresponding value of Conditional Expression (8) to be equal to or greater than the upper limit, a configuration can be made such that the position of the aperture stop St in the front group Gf is prevented from being excessively close to the object side. As a result, there is an advantage in suppressing fluctuation in astigmatism due to focusing. In order to obtain more favorable characteristics, it is more preferable that the imaging lens satisfies Conditional Expression (8-1), and it is yet more preferable that the imaging lens satisfies Conditional Expression (8-2).

$$1.4 < StI/DrI < 2.8 \quad (8)$$

$$1.5 < StI/DrI < 2.6 \quad (8\text{-}1)$$

$$1.6 < StI/DrI < 2.3 \quad (8\text{-}2)$$

Assuming that a minimum value of refractive indexes of all lenses in the front group Gf closer to the object side than the aperture stop St at a d line is Nd1min, it is preferable that the imaging lens satisfies Conditional Expression (9). By not allowing the corresponding value of Conditional Expression (9) to be equal to or less than the lower limit, there is an advantage in reducing the size of the optical system. By not allowing the corresponding value of Conditional Expression (9) to be equal to or greater than the upper limit, it is possible to prevent the amount of correction of spherical aberration from becoming excessive. In order to obtain more favorable characteristics, it is more preferable that the imaging lens satisfies Conditional Expression (9-1), and it is yet more preferable that the imaging lens satisfies Conditional Expression (9-2).

$$1.7 < Nd1\min < 2.1 \quad (9)$$

$$1.78 < Nd1\min < 2 \quad (9\text{-}1)$$

$$1.82 < Nd1\min < 1.9 \quad (9\text{-}2)$$

Each group of imaging lenses can be configured as follows, for example. The first subgroup Gf1 can be configured to consist of three positive lenses and three negative lenses. The positive lens and the negative lens included in the first subgroup Gf1 may be cemented. The first subgroup Gf1 may be configured to consist of three cemented lenses.

The second subgroup Gf2 can be configured to consist of three positive lenses and one negative lens. The second subgroup Gf2 may be configured to consist of, for example, in order from the object side to the image side, a cemented lens, which is formed by cementing a positive lens and a negative lens, and positive lenses which are two single lenses.

The rear group Gr can be configured to consist of one positive lens and two negative lenses. The rear group Gr may be configured to consist of, for example, in order from the object side to the image side, a cemented lens, which is formed by cementing a positive lens and a negative lens, and a negative lens.

The above-mentioned configuration and the example shown in FIG. 1 are an example of the imaging lens of the present disclosure. The number of lenses constituting each group of the imaging lenses of the present disclosure can be different from the number shown in the example shown in FIG. 1. Further, the aperture stop St may be disposed closest to the object side in the front group Gf, or may be disposed closest to the image side in the front group Gf.

The above-mentioned preferable configurations and available configurations including the configurations relating to the conditional expressions may be any combination, and it is preferable to optionally adopt the configurations in accordance with required specification. It should be noted that the conditional expressions that the imaging lens of the present disclosure preferably satisfies are not limited to the conditional expressions described in the form of the expression, and the lower limit and the upper limit are selected from the preferable, more preferable, and yet more preferable conditional expressions. The conditional expressions may include all conditional expressions obtained through optional combinations.

For example, in a preferred embodiment of the imaging lens of the present disclosure, the imaging lens consists of, in order from an object side to an image side, a front group Gf that includes an aperture stop St and has a positive refractive power, and a rear group Gr. During focusing, the entire front group Gf integrally moves, and the rear group Gr remains stationary with respect to an image plane Sim, the rear group Gr includes one or more air lenses formed by two concave lens surfaces facing toward each other. The imaging lens satisfies Conditional Expressions (1) and (2).

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

EXAMPLE 1

FIG. 1 is a cross-sectional view of a configuration of an imaging lens of Example 1, and an illustration method and a configuration thereof are as described above. Therefore, description is partially not repeated herein. The imaging lens of Example 1 consists of a front group Gf having a positive refractive power and a rear group Gr having a positive refractive power, in order from the object side to the image side. The front group Gf consists of a first subgroup Gf1 having a positive refractive power, an aperture stop St, and a second subgroup Gf2 having a positive refractive power, in order from the object side to the image side. During focusing from the infinite distance object to the extremely short range object, the entire front group Gf integrally moves to the object side, and the rear group Gr remains stationary with respect to the image plane Sim.

Regarding the imaging lens of Example 1, Table 1 shows basic lens data, Table 2 shows specifications, Table 3 shows variable surface spacings, and Table 4 shows aspherical coefficients thereof.

Table 1 is noted as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each component at the d line. The column of νd shows an Abbe number of each component based on the d line.

In Table 1, the sign of the curvature radius of the convex surface facing toward the object side is positive and the sign of the curvature radius of the convex surface facing toward the image side is negative. Table 1 also shows the aperture stop St and the optical member PP. In a cell of a surface number of a surface corresponding to the aperture stop St, the surface number and a term of (St) are noted. A value at the bottom cell of D in Table 1 indicates a spacing between the image plane Sim and the surface closest to the image side in the table. In Table 1, each variable surface spacing during focusing uses the symbol DD [ ], and the object side surface number of the spacing is given in [ ] and is noted in the column of D.

Table 2 shows a focal length f of the whole system, a back focal length Bf at the air conversion distance of the whole system, an open F number FNo., a maximum total angle of view 2ω, and a maximum image height Ymax. FNo. of the conditional expressions and FNo. of the tables of specifications, and FNo. of the aberration diagrams to be described later are the same. (°) in the cell of 2ω indicates that the unit thereof is a degree. Table 2 shows values in a state in which the infinite distance object is in focus.

In Table 3, the row of "infinity" shows variable surface spacings in a state in which the infinite distance object is in focus, and the row below it shows variable surface spacings at the object distance of the extremely short range object in a state in which the extremely short range object is in focus. For example, in Table 3, the object distance of the extremely short range object is 0.212 m (meters). Tables 1, 2 and 3 show values in a case where the d line is used as a reference.

In basic lens data, a reference sign * is attached to surface numbers of aspherical surfaces, and numerical values of the paraxial curvature radius are written into the column of the curvature radius of the aspherical surface. In Table 4, the row of Sn shows surface numbers of the aspherical surfaces, and the rows of KA and Am (m=3, 4, 5, . . . 12) show numerical values of the aspherical coefficients for each aspherical surface. The "E±n" (n: an integer) in numerical values of the aspherical coefficients of Table 4 indicates "×bb $10^{\pm n}$". KA and Am are the aspherical coefficients in the aspherical equation represented by the following expression.

$$Zd = Cxh^2/\{1 + (1 - KA \times C^2 \times h^2)^{1/2}\} + \sum Am \times h^m$$

Here,

Zd is an aspherical surface depth (a length of a perpendicular from a point on an aspherical surface at height h to a plane that is perpendicular to the optical axis Z in contact with the vertex of the aspherical surface), h is a height (a distance from the optical axis Z to the lens surface), C is an inverse of the paraxial curvature radius, KA and Am are aspherical coefficients, and $\Sigma$ in the aspherical equation means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd |
|---|---|---|---|---|
| 1 | 31.1431 | 4.9237 | 1.83481 | 42.74 |
| 2 | 118.8649 | 1.0099 | 1.53172 | 48.84 |
| 3 | 16.9895 | 1.8709 | | |
| 4 | 20.7961 | 5.4318 | 1.83481 | 42.74 |
| 5 | 74.7910 | 1.0100 | 1.59551 | 39.24 |
| 6 | 16.4001 | 6.8462 | | |
| 7 | −32.6088 | 0.8098 | 1.60342 | 38.03 |
| 8 | 27.4835 | 5.5745 | 1.88300 | 40.80 |
| 9 | −71.4246 | 2.2714 | | |
| 10(St) | ∞ | 1.8741 | | |
| 11 | −245.2123 | 7.3359 | 1.49700 | 81.54 |
| 12 | −15.3425 | 0.8002 | 1.68893 | 31.07 |
| 13 | 33569.6085 | 0.1300 | | |
| 14 | 46.1713 | 4.4245 | 1.59282 | 68.62 |
| 15 | −88.0833 | 1.7784 | | |
| *16 | −51.4502 | 3.6642 | 1.68948 | 31.02 |
| *17 | −21.5878 | DD[17] | | |

TABLE 1-continued

Example 1

| Sn | R | D | Nd | vd |
|---|---|---|---|---|
| 18 | 35.2043 | 7.3345 | 1.88300 | 40.80 |
| 19 | −43.5844 | 1.0102 | 1.62004 | 36.26 |
| 20 | 27.9800 | 4.5014 | | |
| *21 | −63.9872 | 1.5000 | 1.68948 | 31.02 |
| *22 | −250.0201 | 11.0567 | | |
| 23 | ∞ | 2.8500 | 1.51680 | 64.20 |
| 24 | ∞ | 0.2014 | | |

TABLE 2

Example 1

| | |
|---|---|
| f | 33.98 |
| Bf | 13.14 |
| FNo. | 1.24 |
| 2ω(°) | 47.6 |
| Ymax | 14.45 |

Table 3

Example 1

| | DD[17] |
|---|---|
| Infinity | 0.8921 |
| 0.212 m | 10.1156 |

TABLE 4

Example 1

| Sn | 16 | 17 | 21 | 22 |
|---|---|---|---|---|
| KA | 1.0000000E+00 | 1.0000000E+00 | 1.0000000E+00 | 1.0000000E+00 |
| A3 | 3.9511741E+00 | 3.1609393E+00 | −3.2124509E+00 | 1.0000000E+00 |
| A4 | −5.7117326E−06 | 1.2962870E−05 | 1.2248477E−05 | −1.1813345E−05 |
| A5 | −4.5456953E−06 | −3.7193530E−06 | −7.0713729E−06 | 5.7770793E−06 |
| A6 | 2.2304719E−07 | −2.2824960E−08 | 7.1138423E−07 | −9.7948790E−07 |
| A7 | 2.8112293E−08 | 4.5283368E−08 | 4.1398567E−08 | 8.3806185E−08 |
| A8 | −3.0404465E−09 | −1.4721854E−09 | −7.0880062E−09 | 2.7402759E−09 |
| A9 | −5.6325021E−11 | −2.7108692E−10 | −1.2274984E−10 | −8.7857820E−10 |
| A10 | 1.2462696E−11 | 1.3668605E−11 | 2.8590071E−11 | 2.4554936E−11 |
| A11 | −4.6590123E−14 | 6.0298999E−13 | 1.2291720E−13 | 2.0738404E−12 |
| A12 | −1.7137410E−14 | −3.7667538E−14 | −4.3834162E−14 | −9.3293944E−14 |

Figure 3:
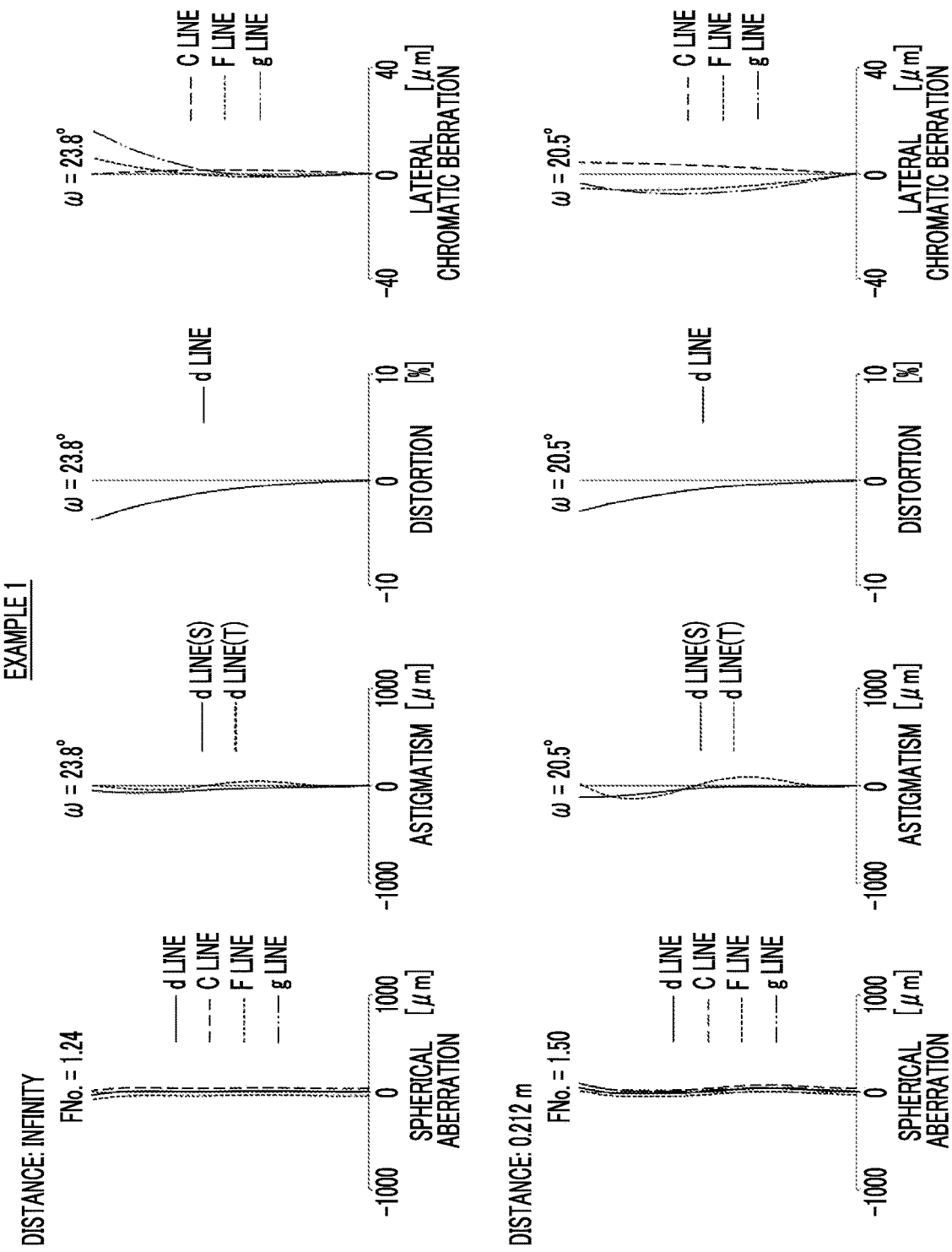
FIG. 3 is a diagram showing aberrations of the imaging lens of Example 1.

FIG. 3 shows a diagram showing aberrations of the imaging lens of Example 1. In FIG. 3, in order from the left side, spherical aberration, astigmatism, distortion, and lateral chromatic aberration are shown. FIG. 3 shows aberration diagrams in a state in which the infinite distance object is in focus in the upper part labeled "DISTANCE: INFINITY", and shows aberration diagrams in a state in which an object at an object distance of 0.212 m (meters) is in focus in the lower part labeled "DISTANCE: 0.212 m". In spherical aberration diagram, aberrations at the d line, the C line, the F line, and the g line are indicated by the solid line, the long broken line, the short broken line, and the two-dot chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In lateral chromatic aberration diagram, aberrations at the C line, the F line, and the g line are respectively indicated by the long broken line, the short broken line, and the two-dot chain line. In the spherical aberration diagram, the value of the open F number is shown after "FNo.=". In other aberration diagrams, the value of the maximum half angle of view is shown after "ω=".

Symbols, meanings, description methods, and illustration methods of the respective data pieces according to Example 1 are the same as those in the following examples unless otherwise specified. Therefore, in the following description, repeated description will not be given.

EXAMPLE 2

Figure 4:
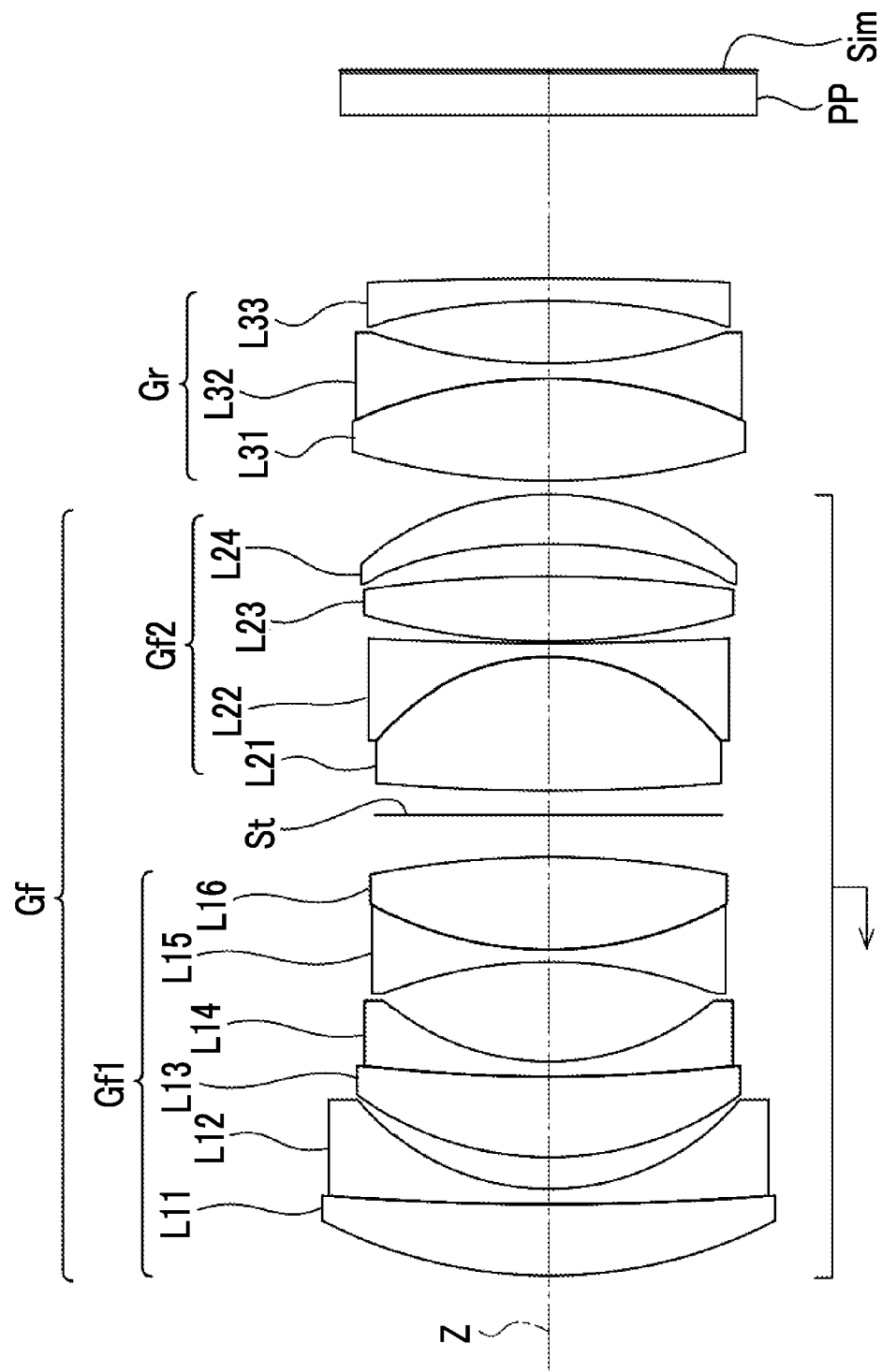
FIG. 4 is a cross-sectional view showing a configuration of an imaging lens of Example 2.

FIG. 4 is a cross-sectional view of a configuration of the imaging lens of Example 2. The imaging lens of Example 2 consists of a front group Gf having a positive refractive power and a rear group Gr having a positive refractive power, in order from the object side to the image side along the optical axis Z. The front group Gf consists of a first subgroup Gf1 having a positive refractive power, an aperture stop St, and a second subgroup Gf2 having a positive refractive power, in order from the object side to the image side. The first subgroup Gf1 consists of six lenses L11 to L16 in order from the object side to the image side. The second subgroup Gf2 consists of four lenses L21 to L24 in order from the object side to the image side. The rear group Gr consists of three lenses L31 to L33 in order from the object side to the image side. During focusing from the infinite distance object to the extremely short range object, the entire front group Gf integrally moves to the object side, and the rear group Gr remains stationary with respect to the image plane Sim.

Figure 5:
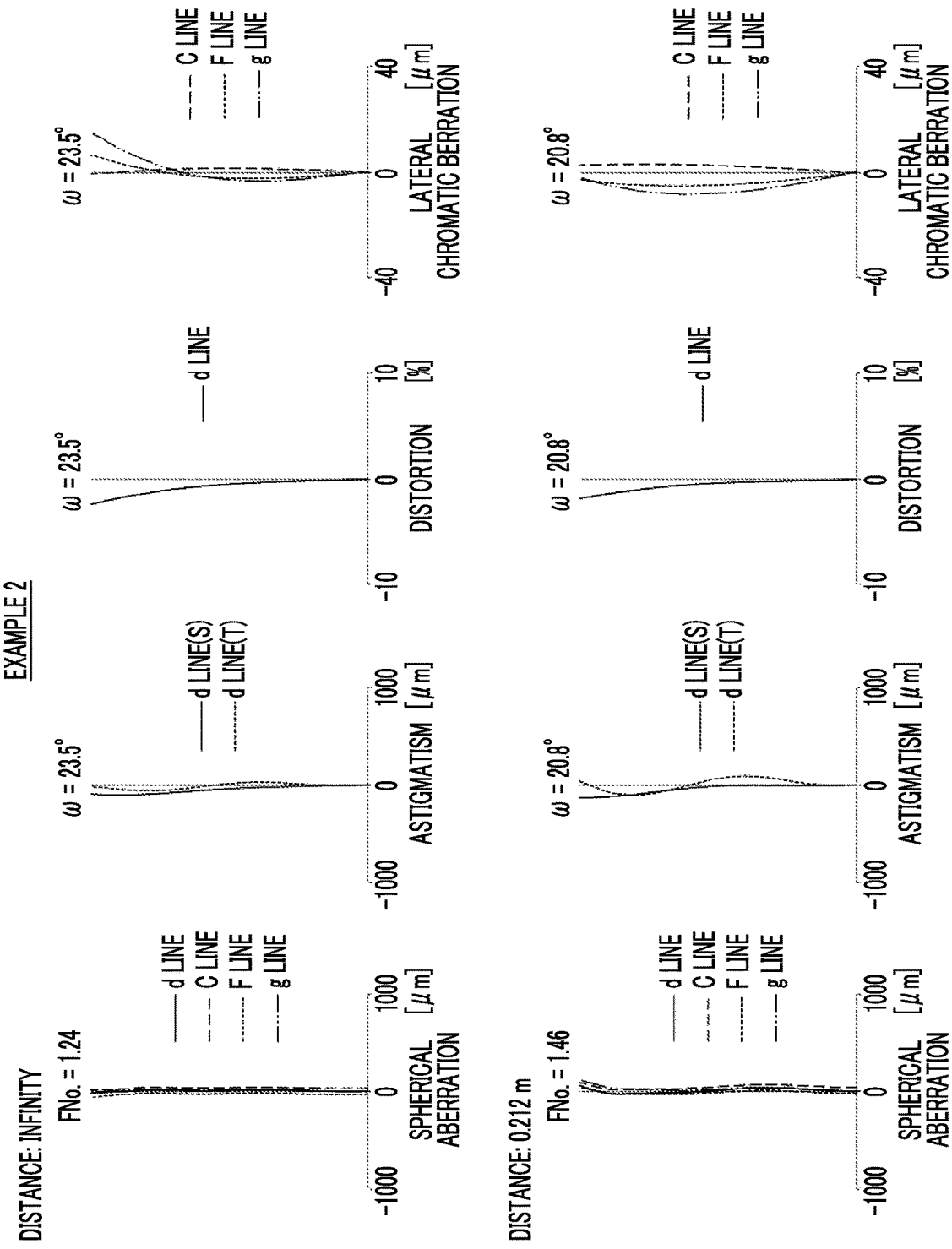
FIG. 5 is a diagram showing aberrations of the imaging lens of Example 2.

Regarding the imaging lens of Example 2, Table 5 shows basic lens data, Table 6 shows specifications, Table 7 shows variable surface spacings, Table 8 shows aspherical coefficients thereof, and FIG. 5 shows aberration diagrams.

TABLE 5

| | Example 2 | | | |
|---|---|---|---|---|
| Sn | R | D | Nd | vd |
| 1 | 34.8421 | 4.8303 | 1.84000 | 43.87 |
| 2 | 204.6108 | 1.0098 | 1.51600 | 52.00 |
| 3 | 17.5636 | 2.1414 | | |
| 4 | 22.8123 | 5.4686 | 1.84000 | 43.53 |
| 5 | 111.6202 | 1.0098 | 1.57273 | 41.36 |
| 6 | 17.9098 | 6.7441 | | |
| 7 | −31.5926 | 0.8098 | 1.70489 | 29.75 |
| 8 | 26.1359 | 6.2612 | 1.96000 | 31.84 |
| 9 | −65.3242 | 2.8363 | | |
| 10(St) | ∞ | 1.6505 | | |
| 11 | 139.1461 | 8.9772 | 1.49700 | 81.54 |
| 12 | −15.4211 | 0.9002 | 1.68184 | 31.30 |
| 13 | 236.6583 | 0.1300 | | |
| 14 | 46.6910 | 4.3898 | 1.70153 | 56.42 |
| 15 | −91.4460 | 2.1899 | | |
| *16 | −44.1113 | 3.3489 | 1.68948 | 31.02 |
| *17 | −21.0495 | DD[17] | | |
| 18 | 47.8068 | 6.9211 | 1.96001 | 31.86 |
| 19 | −33.2242 | 1.0098 | 1.70404 | 29.80 |
| 20 | 36.8717 | 4.2220 | | |
| *21 | −49.8418 | 1.5000 | 1.68948 | 31.02 |
| *22 | −250.0090 | 11.0404 | | |
| 23 | ∞ | 2.8500 | 1.51680 | 64.20 |
| 24 | ∞ | 0.2039 | | |

TABLE 6

| Example 2 | |
|---|---|
| f | 33.99 |
| Bf | 13.12 |
| FNo. | 1.24 |
| 2ω(°) | 47.0 |
| Ymax | 14.45 |

TABLE 7

| Example 2 | |
|---|---|
| | DD[17] |
| Infinity | 0.9078 |
| 0.212 m | 8.0378 |

TABLE 8

| | Example 2 | | | |
|---|---|---|---|---|
| Sn | 16 | 17 | 21 | 22 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.8312136E−06 | 2.0075599E−05 | 5.6129282E−05 | 3.5195611E−05 |
| A5 | −5.9252159E−06 | −5.1344081E−06 | −1.6058497E−05 | −5.4169122E−06 |
| A6 | 3.0611056E−07 | 5.0567913E−11 | 9.0907338E−07 | −2.7322338E−07 |
| A7 | 4.0614675E−08 | 6.5880444E−08 | 1.3085811E−07 | 1.2964787E−07 |
| A8 | −4.4295906E−09 | −2.7251646E−09 | −1.3148529E−08 | −4.6382119E−09 |
| A9 | −1.0849751E−10 | −3.8489599E−10 | −4.9945029E−10 | −8.2715646E−10 |
| A10 | 2.0999110E−11 | 2.3323881E−11 | 6.3403073E−11 | 4.6237032E−11 |
| A11 | 3.4619877E−14 | 8.2290570E−13 | 7.0070249E−13 | 1.6455950E−12 |
| A12 | −3.6577285E−14 | −6.0608780E−14 | −1.0960962E−13 | −1.0879727E−13 |

EXAMPLE 3

Figure 6:
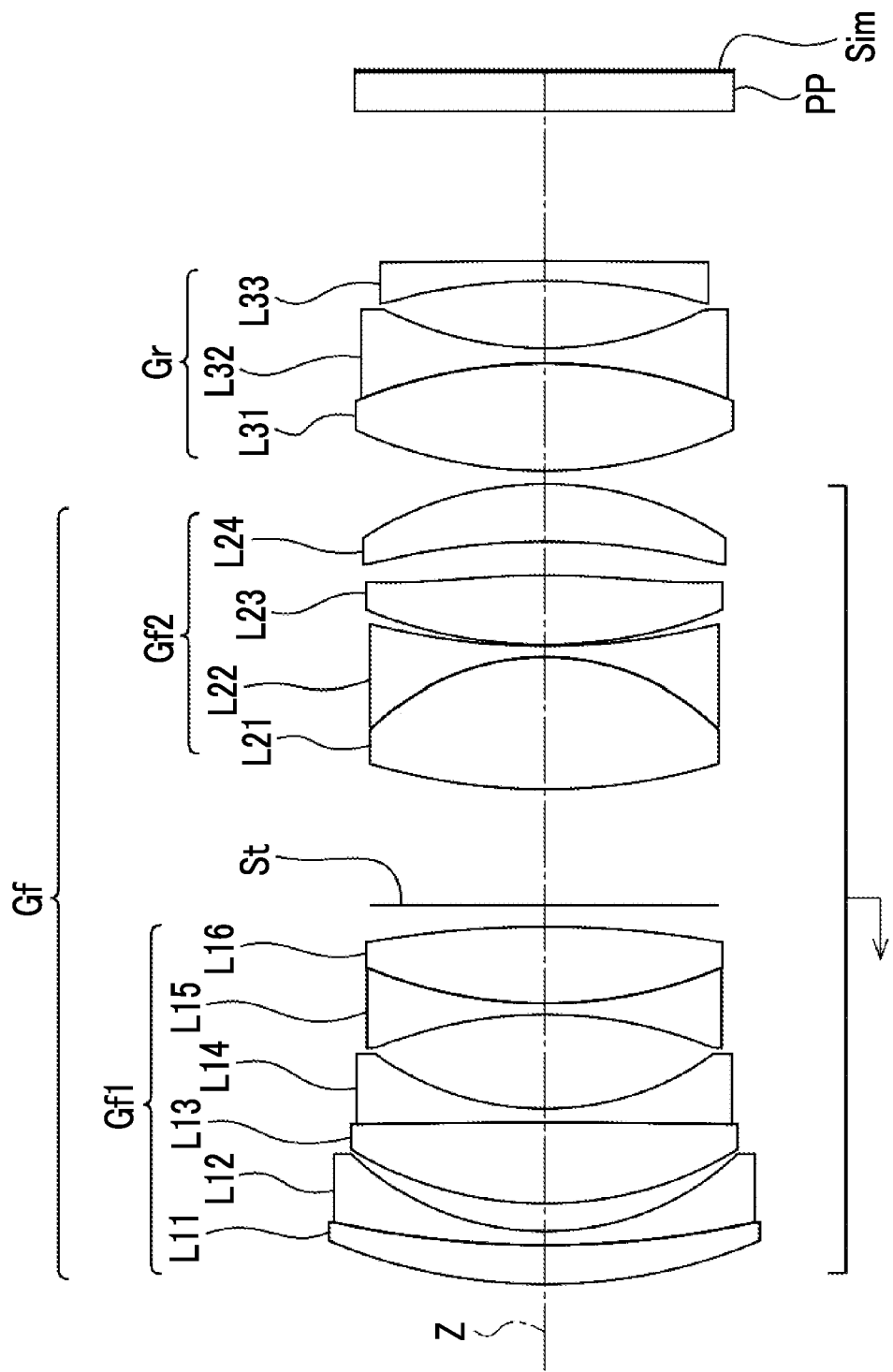
FIG. 6 is a cross-sectional view showing a configuration of an imaging lens of Example 3.

FIG. 6 is a cross-sectional view of a configuration of the imaging lens of Example 3. The imaging lens of Example 3 consists of a front group Gf having a positive refractive power and a rear group Gr having a positive refractive power, in order from the object side to the image side along the optical axis Z. The front group Gf consists of a first subgroup Gf1 having a positive refractive power, an aperture stop St, and a second subgroup Gf2 having a positive refractive power, in order from the object side to the image side. The first subgroup Gf1 consists of six lenses L11 to L16 in order from the object side to the image side. The second subgroup Gf2 consists of four lenses L21 to L24 in order from the object side to the image side. The rear group Gr consists of three lenses L31 to L33 in order from the object side to the image side. During focusing from the infinite distance object to the extremely short range object, the entire front group Gf integrally moves to the object side, and the rear group Gr remains stationary with respect to the image plane Sim.

Figure 7:
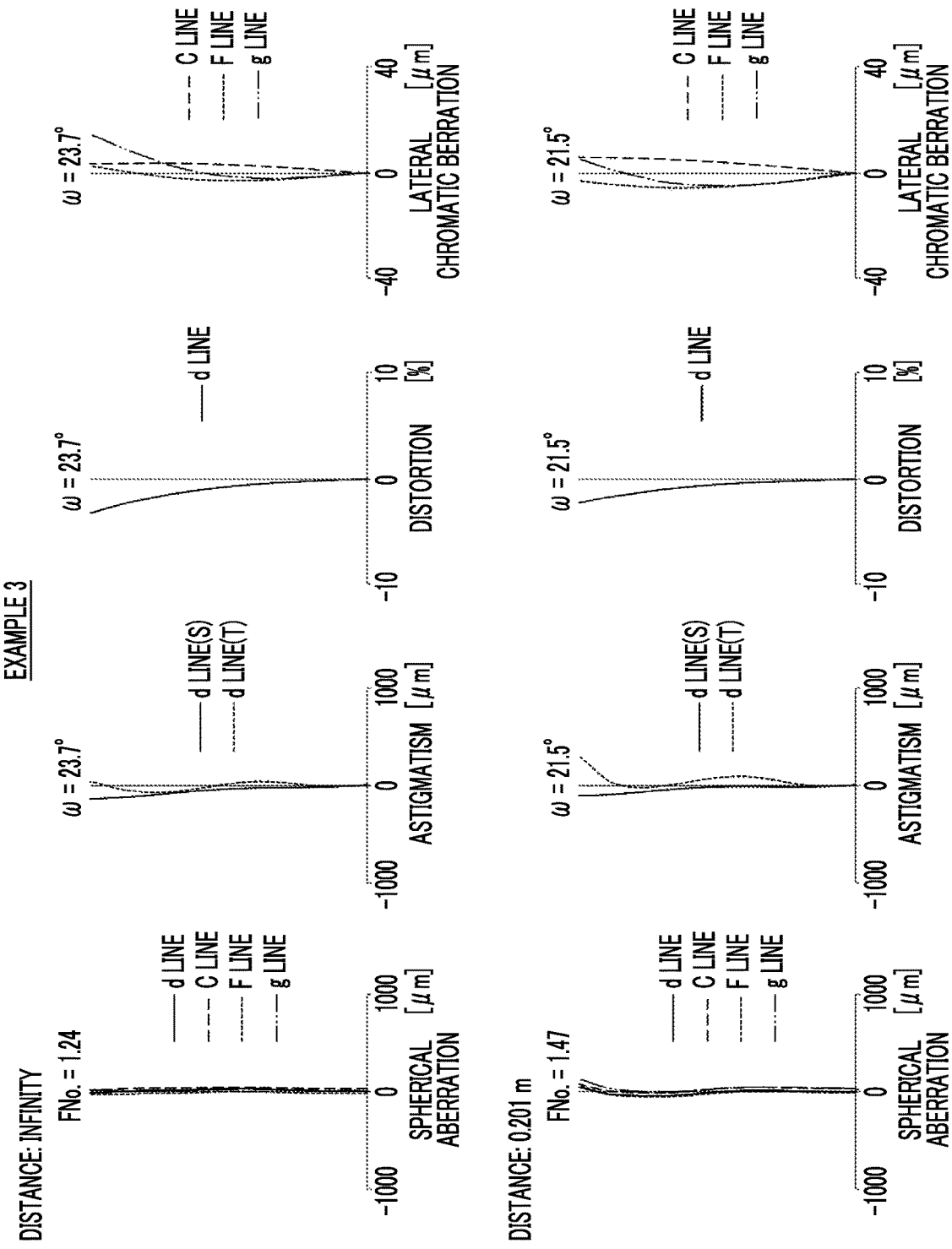
FIG. 7 is a diagram showing aberrations of the imaging lens of Example 3.

Regarding the imaging lens of Example 3, Table 9 shows basic lens data, Table 10 shows specifications, Table 11 shows variable surface spacings, Table 12 shows aspherical coefficients thereof, and FIG. 7 shows aberration diagrams.

Table 9

Example 3

| Sn | R | D | Nd | vd |
|---|---|---|---|---|
| 1 | 43.3197 | 2.9005 | 1.83999 | 43.83 |
| 2 | 75.9090 | 1.0101 | 1.51599 | 52.11 |
| 3 | 21.6265 | 2.0648 | | |
| 4 | 28.8652 | 6.0256 | 1.84001 | 43.76 |
| 5 | −952.3635 | 1.0100 | 1.56958 | 41.95 |
| 6 | 22.3163 | 7.0111 | | |

Table 9-continued

Example 3

| Sn | R | D | Nd | vd |
|---|---|---|---|---|
| 7 | −34.5010 | 0.8098 | 1.62811 | 35.19 |
| 8 | 35.4522 | 5.7173 | 1.96000 | 31.99 |
| 9 | −78.7658 | 1.6000 | | |
| 10(St) | ∞ | 8.6022 | | |
| 11 | 47.9479 | 9.7406 | 1.49700 | 81.54 |
| 12 | −19.1144 | 0.7998 | 1.70281 | 29.86 |
| 13 | 54.1485 | 0.1300 | | |
| *14 | 39.3776 | 5.1153 | 1.55332 | 71.68 |
| *15 | −72.7638 | 2.5159 | | |
| 16 | −54.1863 | 4.2890 | 1.84000 | 28.39 |
| 17 | −25.6860 | DD[17] | | |
| 18 | 35.4450 | 7.9999 | 1.94410 | 33.59 |
| 19 | −38.1024 | 1.1101 | 1.70106 | 29.95 |
| 20 | 27.5028 | 4.9998 | | |
| *21 | −48.4764 | 1.5000 | 1.68948 | 31.02 |
| *22 | −249.9795 | 11.1066 | | |
| 23 | ∞ | 2.8500 | 1.51680 | 64.20 |
| 24 | ∞ | 0.2035 | | |

TABLE 10

Example 3

| | |
|---|---|
| f | 33.98 |
| Bf | 13.19 |
| FNo. | 1.24 |
| 2ω(°) | 47.4 |
| Ymax | 14.45 |

TABLE 11

Example 3

| | DD[17] |
|---|---|
| Infinity | 0.9523 |
| 0.201 m | 9.5625 |

TABLE 12

Example 3

| Sn | 14 | 15 | 21 | 22 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.6667239E−07 | 1.8023346E−05 | 4.1717662E−05 | 2.8184646E−05 |
| A5 | 1.4281481E−06 | 1.6167265E−06 | −1.4258248E−05 | −3.7951107E−06 |
| A6 | −3.1920839E−07 | −3.6447151E−07 | 1.0742538E−06 | −5.6221644E−07 |
| A7 | 1.6318779E−08 | 1.6272847E−08 | 9.3170220E−08 | 1.6383238E−07 |
| A8 | 2.2276348E−09 | 2.2803799E−09 | −1.2458918E−08 | −4.0088447E−09 |
| A9 | −2.1342929E−10 | −1.6314949E−10 | −2.5237144E−10 | −1.1579934E−09 |
| A10 | −1.7717901E−12 | −4.2206589E−12 | 5.3341395E−11 | 5.8404846E−11 |
| A11 | 6.0480058E−13 | 4.0952481E−13 | 1.7505975E−13 | 2.3385988E−12 |
| A12 | −1.1784087E−14 | −6.2247436E−16 | −8.5322142E−14 | −1.4856056E−13 |

Table 13 shows the corresponding values of Conditional Expressions (1) to (9) of the imaging lenses of the above-mentioned examples. Table 13 shows values in a case where the d line is used as a reference.

Table 13

| Expression number | | Example 1 | Example 2 | Example 3 |
|---|---|---|---|---|
| (1) | Bf/f | 0.387 | 0.386 | 0.388 |
| (2) | (Rrf + Rrr)/(Rrf − Rrr) | −0.392 | −0.150 | −0.276 |
| (3) | (Rff + Rfr)/(Rff − Rfr) | −0.331 | −0.276 | −0.214 |
| (4) | f/fr | 0.145 | 0.005 | 0.026 |
| (5) | f1/f2 | 5.382 | 7.308 | 13.874 |
| (6) | TTL × FNo/Ymax | 6.683 | 6.875 | 7.620 |
| (7) | Stl/TTL | 0.619 | 0.613 | 0.684 |
| (8) | Stl/DrI | 1.705 | 1.780 | 2.049 |
| (9) | Nd 1 min | 1.83481 | 1.84000 | 1.83999 |

Figure 8:
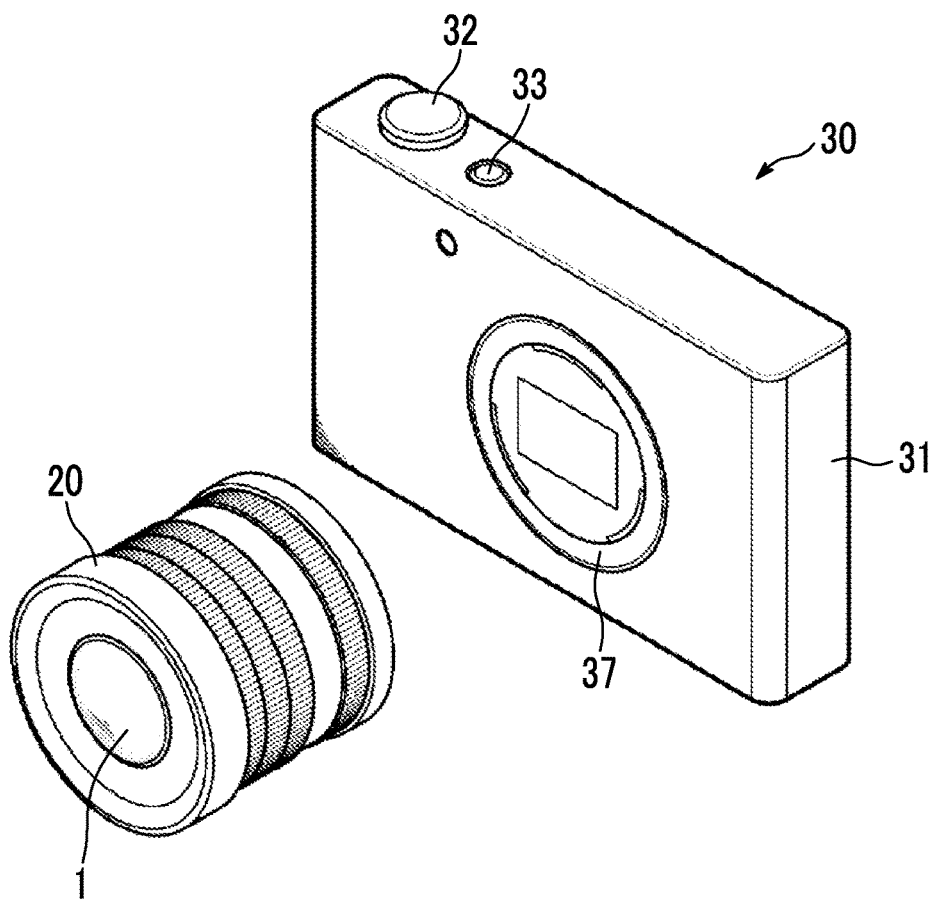
FIG. 8 is a perspective view of the front side of the imaging apparatus according to an embodiment.
Figure 9:
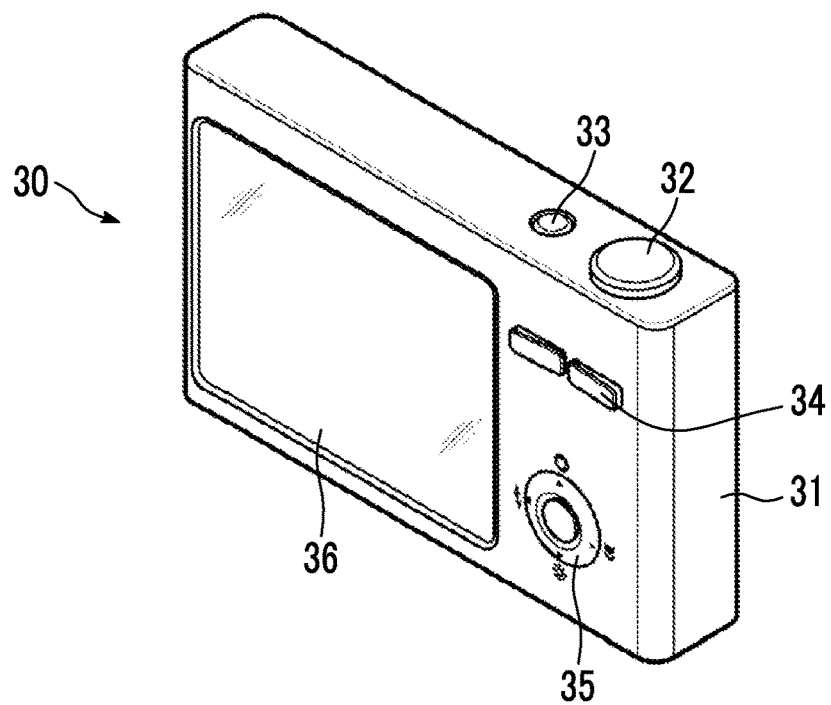
FIG. 9 is a perspective view of the rear side of the imaging apparatus according to the embodiment.

Next, an imaging apparatus according to an embodiment of the present disclosure will be described. FIGS. 8 and 9 are external views of a camera 30 which is the imaging apparatus according to the embodiment of the present disclosure. FIG. 8 is a perspective view of the camera 30 viewed from a front side, and FIG. 9 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation unit 34, an operation unit 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video when the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side, a front group that includes a stop and has a positive refractive power, and a rear group,
   wherein during focusing, an entirety of the front group integrally moves, and the rear group remains stationary with respect to an image plane,
   the rear group includes one or more air lenses formed by two concave lens surfaces facing toward each other,
   assuming that
      a back focal length of the imaging lens at an air conversion distance in a state in which an infinite distance object is in focus is Bf,
      a focal length of the imaging lens in a state in which the infinite distance object is in focus is f, and
      a curvature radius of an object side surface of at least one of the air lenses in the rear group is Rrf and a curvature radius of an image side surface thereof is Rrr,
   Conditional Expressions (1) and (2) are satisfied, which are represented by $$0.1 < Bf/f < 0.9, \text{ and} \qquad (1)$$

$$-0.7 < (Rrf + Rrr)/(Rrf - Rrr) < -0.025, \text{ and} \qquad (2)$$

assuming that
   a minimum value of refractive indexes of all lenses in the front group closer to the object side than the stop at a d line is Nd1min,
   Conditional Expression (9) is satisfied, which is represented by $$1.7 < Nd1\min < 2.1. \qquad (9)$$

2. The imaging lens according to claim 1,
   wherein the front group includes one or more air lenses formed by two concave lens surfaces facing toward each other, and
   assuming that a curvature radius of an object side surface of at least one of the air lenses in the front group is Rff and a curvature radius of an image side surface thereof is Rfr, Conditional Expression (3) is satisfied, which is represented by $$-0.6 < (Rff + Rfr)/(Rff - Rfr) < 0. \quad (3)$$

3. The imaging lens according to claim 1, wherein assuming that a focal length of the rear group is fr, Conditional Expression (4) is satisfied, which is represented by $$0 < f/fr < 0.4. \quad (4)$$

4. The imaging lens according to claim 1,
wherein the front group consists of, in order from the object side to the image side, a first subgroup, a stop, and a second subgroup, and
assuming that
a focal length of the first subgroup is f1, and
a focal length of the second subgroup is f2,
Conditional Expression (5) is satisfied, which is represented by $$3.5 < f1/f2 < 16. \quad (5)$$

5. The imaging lens according to claim 1, wherein assuming that
a sum of Bf and a distance on an optical axis from a lens surface closest to the object side in the front group to a lens surface closest to the image side in the rear group in a state in which the infinite distance object is in focus is TTL,
an open F number in a state in which the infinite distance object is in focus is FNo, and
a maximum image height is Ymax,
Conditional Expression (6) is satisfied, which is represented by $$5 < TTL \times FNo/Y\text{max} < 8.5. \quad (6)$$

6. The imaging lens according to claim 1, wherein assuming that
a sum of Bf and a distance on an optical axis from the stop to a lens surface closest to the image side in the rear group in a state in which the infinite distance object is in focus is StI, and
a sum of Bf and a distance on an optical axis from a lens surface closest to the object side in the front group to the lens surface closest to the image side in the rear group in a state in which the infinite distance object is in focus is TTL,
Conditional Expression (7) is satisfied, which is represented by $$0.3 < StI/TTL < 0.85. \quad (7)$$

7. The imaging lens according to claim 1, wherein assuming that
a sum of Bf and a distance on an optical axis from the stop to a lens surface closest to the image side in the rear group in a state in which the infinite distance object is in focus is StI, and
a sum of Bf and a distance on an optical axis from a lens surface closest to the image side in the front group to the lens surface closest to the image side in the rear group in a state in which the infinite distance object is in focus is DrI,
Conditional Expression (8) is satisfied, which is represented by $$1.4 < StI/DrI < 2.8. \quad (8)$$

8. The imaging lens according to claim 1, wherein the rear group includes one or more positive lenses and one or more negative lenses.

9. The imaging lens according to claim 1,
wherein a lens closest to the object side in the front group has a convex surface facing toward the object side, and
a lens closest to the image side in the front group has a convex surface facing toward the image side.

10. The imaging lens according to claim 1, wherein the front group includes one or more positive lenses and one or more negative lenses.

11. The imaging lens according to claim 1, wherein the front group includes two or more cemented lenses each including one or more positive lenses and one or more negative lenses.

12. The imaging lens according to claim 1, wherein the front group includes two or more lenses each having a concave surface facing toward the image side at a position closer to the object side than the stop.

13. The imaging lens according to claim 1, wherein Conditional Expression (1-1) is satisfied, which is represented by $$0.2 < Bf/f < 0.8. \quad (1\text{-}1)$$

14. The imaging lens according to claim 1, wherein Conditional Expression (2-1) is satisfied, which is represented by $$-0.6 < (Rrf + Rrr)/(Rrf - Rrr) < -0.05. \quad (2\text{-}1)$$

15. The imaging lens according to claim 2, wherein Conditional Expression (3-1) is satisfied, which is represented by $$-0.5 < (Rff + Rfr)/(Rff - Rfr) < -0.05. \quad (3\text{-}1)$$

16. The imaging lens according to claim 3, wherein Conditional Expression (4-1) is satisfied, which is represented by $$0 < f/fr < 0.3. \tag{4-1}$$

17. The imaging lens according to claim 5, wherein Conditional Expression (6-1) is satisfied, which is represented by $$5.25 < TTL \times FNo/Y\text{max} < 8. \tag{6-1}$$

18. An imaging apparatus comprising:
the imaging lens according to claim 1; and
an imaging element for outputting a captured image signal based on a subject image which is formed by the imaging lens.

19. An imaging lens consisting of, in order from an object side to an image side, a front group that includes a stop and has a positive refractive power, and a rear group,
wherein during focusing, an entirety of the front group integrally moves, and the rear group remains stationary with respect to an image plane,
the rear group includes one or more air lenses formed by two concave lens surfaces facing toward each other, and
assuming that
a back focal length of the imaging lens at an air conversion distance in a state in which an infinite distance object is in focus is Bf,
a focal length of the imaging lens in a state in which the infinite distance object is in focus is f, and
a curvature radius of an object side surface of at least one of the air lenses in the rear group is Rrf and a curvature radius of an image side surface thereof is Rrr,
Conditional Expressions (1) and (2) are satisfied, which are represented by $$0.1 < Bf/f < 0.9, \text{ and} \tag{1}$$

$$-0.7 < (Rrf + Rrr)/(Rrf - Rrr) < -0.025, \tag{2}$$

wherein the front group consists of, in order from the object side to the image side, a first subgroup, a stop, and a second subgroup, and
assuming that
a focal length of the first subgroup is f1, and
a focal length of the second subgroup is f2, and
wherein Conditional Expression (5-1) is satisfied, which is represented by $$4.5 < f1/f2 < 15. \tag{5-1}$$

* * * * *